(12) United States Patent
Richardson et al.

(10) Patent No.: US 9,899,822 B2
(45) Date of Patent: Feb. 20, 2018

(54) THREADED HOLE RETAINER

(71) Applicant: NEXANS, Paris (FR)

(72) Inventors: Jeremy Richardson, Butler, PA (US);
Brad A Angus, Boardman, OH (US);
Scott Nemes, Youngstown, OH (US)

(73) Assignee: Nexans, Paris (FR)

( * ) Notice: Subject to any disclaimer, the term of this patent is extended or adjusted under 35 U.S.C. 154(b) by 0 days.

(21) Appl. No.: 14/987,070

(22) Filed: Jan. 4, 2016

(65) Prior Publication Data
US 2017/0302062 A1 Oct. 19, 2017

(51) Int. Cl.
*H02G 3/22* (2006.01)
*B60R 16/02* (2006.01)

(52) U.S. Cl.
CPC ........... *H02G 3/22* (2013.01); *B60R 16/0222* (2013.01)

(58) Field of Classification Search
CPC ..... H02G 3/22; B60R 16/0222; F16L 3/1075; F16B 21/084
USPC ........... 248/56, 68.1; 174/135; 411/508, 510
See application file for complete search history.

(56) References Cited

U.S. PATENT DOCUMENTS

| | | | | |
|---|---|---|---|---|
| 5,672,038 A * | 9/1997 | Eaton | ...................... | F16B 15/06 411/508 |
| 5,906,465 A * | 5/1999 | Sato | ...................... | F16B 21/084 248/68.1 |
| 5,907,891 A * | 6/1999 | Meyer | ................... | F16B 19/004 24/297 |
| 6,320,134 B1 * | 11/2001 | Rehberg | ................... | H02G 3/26 174/135 |
| 7,201,352 B2 * | 4/2007 | Kawai | ................... | F16L 3/1075 24/543 |
| 7,753,320 B2 * | 7/2010 | Geiger | ................. | F16B 21/084 248/68.1 |
| 7,866,612 B2 * | 1/2011 | Doi | ......................... | F16L 3/137 248/67.5 |
| 7,891,926 B2 * | 2/2011 | Jackson, Jr. | .......... | F16B 21/084 411/510 |
| 7,896,601 B2 * | 3/2011 | Kalyanadurga | ....... | F16B 21/084 411/508 |
| 2005/0242247 A1 * | 11/2005 | Geiger | ................. | F16L 3/2332 248/74.3 |
| 2013/0119208 A1 | 5/2013 | Geiger | | |

FOREIGN PATENT DOCUMENTS

| | | |
|---|---|---|
| DE | 102014008690 | 12/2015 |
| EP | 1830076 | 9/2007 |
| JP | 2014167324 | 9/2014 |
| WO | 2009042824 | 4/2009 |

OTHER PUBLICATIONS

European Search Report Dated May 16, 2017.

* cited by examiner

*Primary Examiner* — Anita M King
(74) *Attorney, Agent, or Firm* — Sofer & Haroun, LLP

(57) ABSTRACT

The present arrangement provides a hole retainer for insertion into a threaded hole. The hole retainer has a saddle configured to accept and retain an object, a stabilizing post, and a plurality of staggered locking teeth. The staggered locking teeth extend from the bottom of the stabilizing post upward in a manner such that they engage with threads inside the threaded hole.

7 Claims, 3 Drawing Sheets

THREADED HOLE RETAINER

BACKGROUND

Field of the Invention

The present arrangement is directed to a hole retainer. More particularly, the present arrangement is for an improved hole retainer with locking teeth for engaging threads.

Description of Related Art

A hole retainer is a device that interfaces with a hole, such as a threaded hole, that retains a secondary object (part or piece) to it. In the automotive industry, there are often items such as wire harnesses that need to be attached to holes located at various locations on the vehicle. For example, when assembling a car, often wire harnesses are routed on a completed engine or chassis assembly, and/or throughout the entire interior of a vehicle.

The most common use for such hole retainers is in the automotive industry for cars and commercial vehicles. However, hole retainers may be used in other industrial applications as well.

In the prior art, as shown in FIG. 1, hole retainers are typically fir tree designs. However, such fir tree designs are intended to be used in panel mount applications which are not typically threaded. When these fir tree designs are used in a threaded hole applications the engage force (i.e. to insert) is significantly higher than if mounted in a panel hole. This is a result of the cumulative deformation of the fir features, the deeper the engagement, the greater the engagement force. This results in the hole retainers being not fully seated as well as ergonomic complaints from operators.

OBJECTS AND SUMMARY

The present application is directed to a hole retainer with features that allow it to be inserted into a threaded hole with lower and constant engage force that provides the same or higher level of retention than prior art fir tree designs. As noted in more detail below staggered locking teeth can match thread size and pitch and provide constant engagement with threads within a hole regardless of retainer installation orientation. Additionally, flexible lock arms are configured to engage on one side only. The lock arm design functions in a manner that flexes easily during installation to reduce insertion effort. Then once engaged, breakage is required for extraction without unscrewing (twisting) from hole, resulting in a high retention to insertion ratio.

To this end, the present arrangement provides a hole retainer for insertion into a threaded hole. The hole retainer has a saddle configured to accept and retain an object, a stabilizing post, and a plurality of staggered locking teeth. The staggered locking teeth extend from the bottom of the stabilizing post upward in a manner such that they engage with threads inside the threaded hole.

BRIEF DESCRIPTION OF THE DRAWINGS

The present invention can be best understood through the following description and accompanying drawings, wherein.

DETAILED DESCRIPTION

Figure 1:
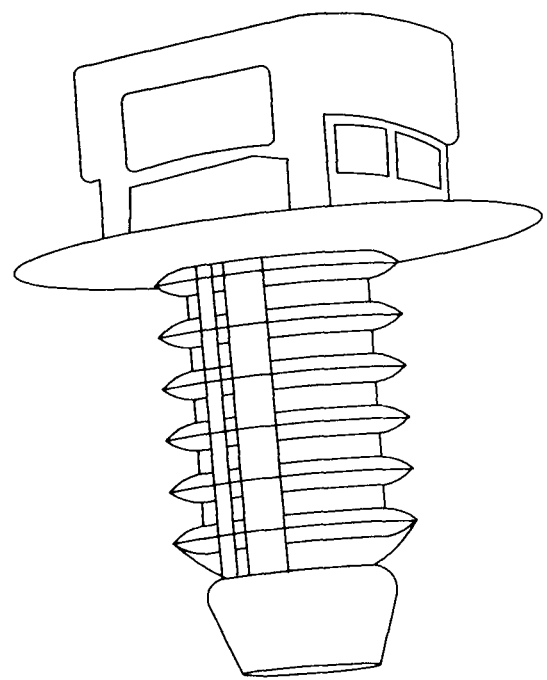
FIG. 1 shows a prior art fir tree hold retainer.
Figure 2A:
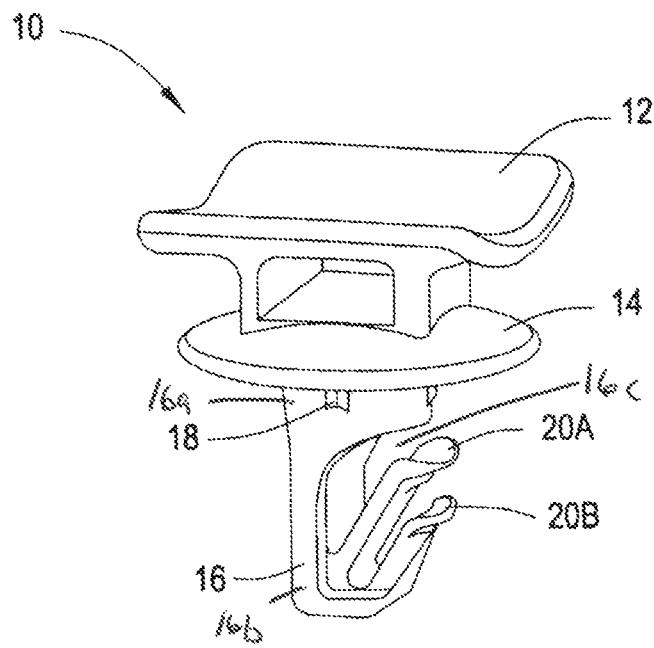
FIGS. 2A and 2B show a hole retainer, in accordance with one embodiment.
Figure 2B:
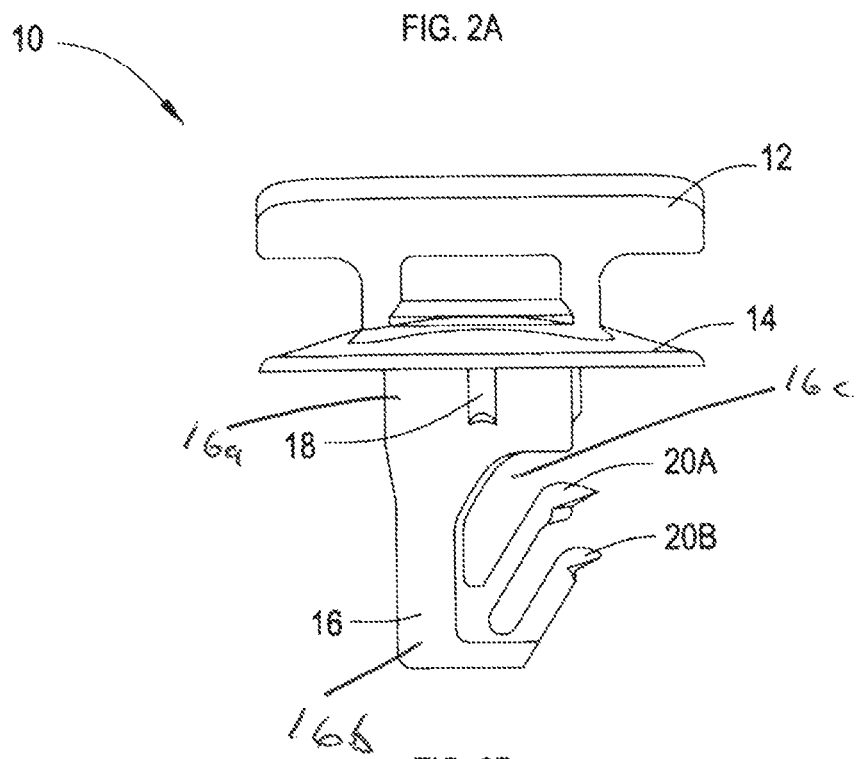

The present arrangement as shown in FIGS. 2A and 2B, a threaded hole retainer 10 is shown having a wire bundle saddle 12, a pre load flange 14, a stabilizing post 16 (upper portion 16a, lower portion 16b, cut away portion 16c) of a defined circumference, four (4) anti-rattle rail posts 18 and two staggered locking teeth 20a (upper) and 20b (lower) constructed as elongate elements extending from lower portion 16b in an inclined manner upwards through cut away portion 16c.

Retainer 10 is typically constructed from injection molding using Polyamide 66 or Polyamide 46, however, the features of the present arrangement may be used with other polymers depending on the application. Wire bundle saddle 12 is the structure on retainer 10 that is configured to receive the wire harness. Wire saddle 12 aids in the installation of the wire harness covering or other objects attached to retainer 10, providing a more uniform fit for the wire harness as compared to prior art retainer such as the fir tree clips.

Preload flange 14 is designed to help maintain proper tooth engagement to the threads in the threaded hole once stabilizing post 16 and staggered locking teeth 20A and 20B of retainer 10 are installed. Anti-rattle posts 18 located near the top of stabilizing post 16 keep threaded hole retainer 10 from moving laterally within the threaded hole and in instances where "noise" or vibration is a concern. Such anti rattle posts 18 serve to keep retainer 10 and an attached (wire harness) in a stable attached position.

As shown in FIGS. 2A and 2B, staggered locking teeth 20A and 20B extend from a bottom portion of stabilizing post 16 and extend upward. Teeth 20A and 20B are advantageously angled to match the threads of the hole into which retainer 10 is to be inserted in order to maximize engagement area. Although the present illustration shows two locking teeth 20A and 20B, it is understood that more or less teeth may be used, and angled differently if needed, depending on the application and in particular the dimensions of the threaded hole that retainer 10 is intended for.

Figure 3:
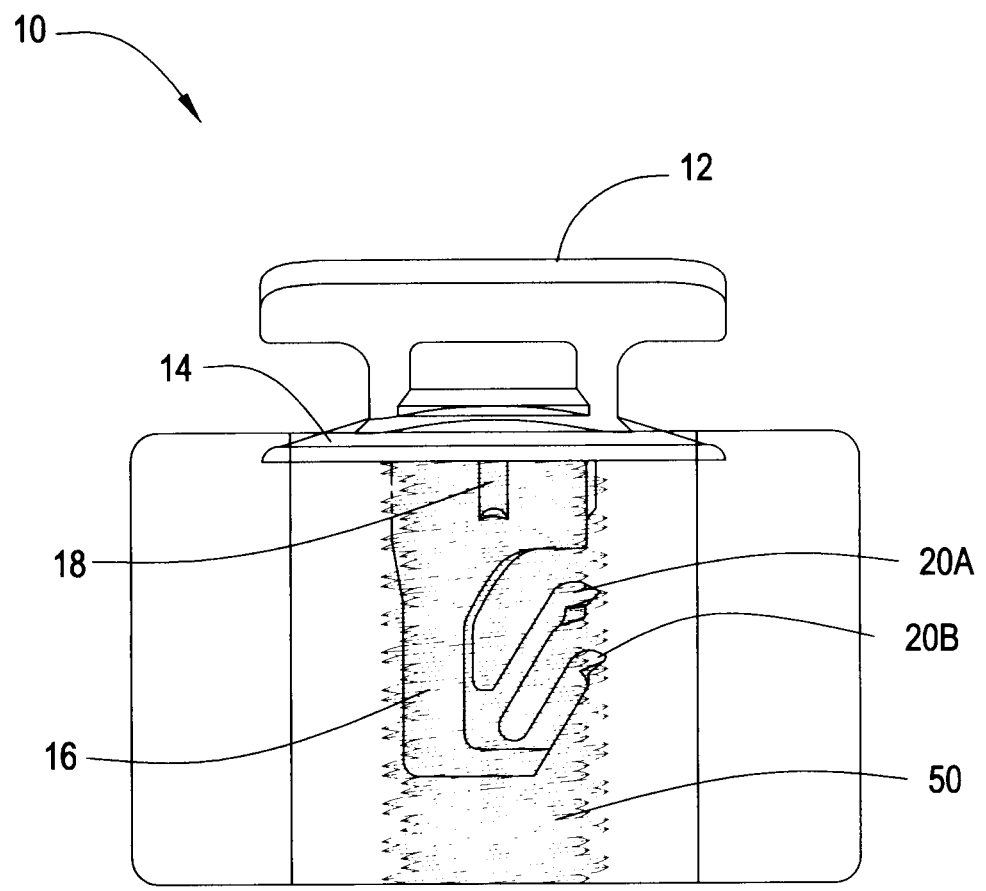
FIG. 3 shows a hole retainer with a threaded hole, in accordance with one embodiment.

When in use as shown in FIG. 3, hole retainer 10 is inserted into a threaded hole 50 screwing in Stabilizer 16 and teeth 20A and 20B, either clockwise or counterclockwise depending on type of threads in the hole and can be removed screwing out. In a preferred method, retainer 10 is installed by simply pushing threaded hole retainer directly into threaded hole such that teeth 20 simply deflect during insertion.

During the installation process retainer 10 is inserted to a depth such that preload flange 14 flexes so that once teeth 20A and 20B are engaged with the threads in the hole, preload flange 14 provides directed pressure to the threaded hole to help hold retainer 10 in position. As noted above, with retainer 10 inserted, anti-rattle posts 18 work to keep threaded hole retainer 10 stable.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:

1. A hole retainer for insertion into a threaded hole, said hole retainer comprising:

a saddle configured to accept and retain an object;

a stabilizing post having an upper portion and a lower portion, with the upper portion having a defined circumference; and a plurality of staggered locking teeth extending from the lower portion of the stabilizing post, wherein said stabilizing post has a cut-away portion at the lower portion, from which the staggered locking teeth extend, and wherein said staggered locking teeth are each in the form of an elongate element located only on one side of the stabilizing post extending from the lower portion of said stabilizing post at the cut-away portion, upward in an inclined manner and extending beyond the circumference of the upper portion of the stabilizing post such that said staggered locking teeth engage with threads inside said threaded hole.

2. The hole retainer as claimed in claim 1, wherein said saddle is a wire bundle saddle for accepting and retaining a wire bundle.

3. The hole retainer as claimed in claim 1, wherein said hole retainer further comprises a pre load flange at the top of said stabilizing post, said pre load flange configured, upon insertion of said hole retainer into said threaded hole, to flex and press down against the top of said threaded hole to stabilize said hole retainer in said threaded hole.

4. The hole retainer as claimed in claim 1, wherein said hole retainer further comprises anti-rattle rail posts on said stabilizing post, said anti-rattle posts configured to assist in retaining said stabilizing post within said threaded hole and to suppress vibrations.

5. The hole retainer as claimed in claim 1, wherein said hole retainer is constructed from either one of injection molded Polyamide 66 or Polyamide 46.

6. The hole retainer as claimed in claim 1, wherein said staggered locking teeth are configured to deflect when pushed into the threaded hole and then, once stabilizing post is fully inserted, extend back into the threads of said threaded hole.

7. The hole retainer as claimed in claim 1, wherein said staggered locking teeth are configured to engage the threads of said threaded hole for insertion by turning until said stabilizing post is fully inserted into said threaded hole.

* * * * *